(12) United States Patent
Achiwa et al.

(10) Patent No.: US 9,598,161 B2
(45) Date of Patent: Mar. 21, 2017

(54) CATALYST INSTALLATION STRUCTURE OF OUTBOARD MOTOR

(71) Applicant: SUZUKI MOTOR CORPORATION, Hamamatsu-Shi, Shizuoka-Ken (JP)

(72) Inventors: Tetsushi Achiwa, Hamamatsu (JP); Keisuke Daikoku, Hamamatsu (JP)

(73) Assignee: SUZUKI MOTOR CORPORATION (JP)

( * ) Notice: Subject to any disclaimer, the term of this patent is extended or adjusted under 35 U.S.C. 154(b) by 0 days.

(21) Appl. No.: 15/001,796

(22) Filed: Jan. 20, 2016

(65) Prior Publication Data
US 2016/0221658 A1  Aug. 4, 2016

(30) Foreign Application Priority Data

Feb. 3, 2015  (JP) ................................ 2015-019455

(51) Int. Cl.
| | | |
|---|---|---|
| *B63H 21/34* | (2006.01) | |
| *B63H 20/24* | (2006.01) | |
| *F01N 3/20* | (2006.01) | |
| *F01N 13/18* | (2010.01) | |
| *F01N 3/04* | (2006.01) | |
| *F01N 3/10* | (2006.01) | |
| *F01N 3/28* | (2006.01) | |

(Continued)

(52) U.S. Cl.
CPC .......... *B63H 20/245* (2013.01); *F01N 3/046* (2013.01); *F01N 3/10* (2013.01); *F01N 3/20* (2013.01); *F01N 3/2842* (2013.01); *F01N 3/2867* (2013.01); *F01N 13/10* (2013.01); *F01N 13/141* (2013.01); *F01N 13/18* (2013.01); *F01N 13/1827* (2013.01); *F01N 2590/021* (2013.01)

(58) Field of Classification Search
CPC ....................................................... B63H 21/34
USPC ........................................................ 440/89 H
See application file for complete search history.

(56) References Cited

U.S. PATENT DOCUMENTS

| | | | | |
|---|---|---|---|---|
| 6,884,133 B2* | 4/2005 | Ishii | .................... | F01N 3/046 440/89 H |
| 7,704,111 B2* | 4/2010 | Ito | ......................... | F01N 3/10 440/88 R |

(Continued)

FOREIGN PATENT DOCUMENTS

| | | |
|---|---|---|
| JP | 2010-242744 | 10/2010 |
| JP | 2010242744 A * | 10/2010 |

(Continued)

*Primary Examiner* — Lars A Olson
*Assistant Examiner* — Jovon Hayes
(74) *Attorney, Agent, or Firm* — Barnes & Thornburg LLP

(57) ABSTRACT

An outboard motor equipped with a four-stroke engine and provided with a catalyst installation structure, in which an exhaust passage is connected to the exhaust ports of the plurality of the cylinders to lead the exhaust gas out of the engine is provided with a catalyst storage chamber configured to store a catalytic converter for cleaning up the exhaust gas, the exhaust passage being integrally formed to the cylinder block, and the catalytic converter is mounted to the catalyst storage chamber by being inserted from a lower side thereof in such a manner as that at least one side end portion thereof is fitted to the catalyst storage chamber to permit expansion of the catalytic converter in an axial direction thereof.

5 Claims, 8 Drawing Sheets

(51) Int. Cl.
*F01N 13/10* (2010.01)
*F01N 13/14* (2010.01)

(56) References Cited

U.S. PATENT DOCUMENTS

| | | | | |
|---|---|---|---|---|
| 8,668,538 B1 * | 3/2014 | Langenfeld | ............ | B63H 21/34 |
| | | | | 440/89 H |
| 8,801,482 B2 * | 8/2014 | Ochiai | ....................... | F01N 3/28 |
| | | | | 440/89 H |
| 9,174,818 B1 * | 11/2015 | Langenfeld | ............ | B63H 21/34 |

FOREIGN PATENT DOCUMENTS

| JP | 2013-124594 | 6/2013 |
| JP | 2013124594 A * | 6/2013 |

* cited by examiner

CATALYST INSTALLATION STRUCTURE OF OUTBOARD MOTOR

CROSS REFERENCE TO RELATED APPLICATION

This application is based upon and claims the benefit of priority of the prior Japanese Patent Application No. 2015-019455, filed Feb. 3, 2015, the entire contents of which are incorporated herein by reference.

BACKGROUND OF THE INVENTION

Field of the Invention

The present invention relates to a catalyst installation structure of an outboard motor, in which a catalytic converter for purifying or cleaning up an exhaust gas (or merely exhaust) discharged from a four-stroke-cycle engine mounted in an outboard is installed to an exhaust passage.

Rerated Art

Prior art of an outboard motor of conventional art has provided an exhaust device, in which an outboard motor is provided with an exhaust passage (or exhaust gas passage) for guiding an exhaust (gas) outside the engine, and a catalyst for cleaning up the exhaust gas is disposed inside the exhaust passage such as disclosed in Japanese Patent Laid-open No. 2010-242744 and No. 2013-124594 (Patent Documents 1 and 2).

In an outboard motor particularly disclosed in the Patent Document 1, however, a catalyst is disposed in a manner supported in a vertical direction between a catalyst housing portion and an exhaust gas guide. Because of such arrangement, in an event when a relative change in dimension in an axial direction is caused between the catalyst, the catalyst housing portion and the exhaust gas guide, the catalyst is thermally excessively expanded, and in an adverse case, the catalyst may be destroyed.

SUMMARY OF THE INVENTION

The present invention was conceived in consideration of the circumstances of the prior art mentioned above, and an object thereof is to provide a catalyst installation structure in an outboard motor for the purpose of surely preventing damage or destroying of a catalyst by a thermal expansion of a catalytic converter.

The above and other objects can be achieved according to the present invention by providing a catalyst installation structure of an outboard motor equipped with a four-stroke engine, in which the four-stroke engine includes: a cylinder block in which a cylinder is formed so as to extend in a horizontal direction; a cylinder head fixed to the cylinder block so as to cover the cylinder and to form a combustion chamber in conjunction with the cylinder, the cylinder head being provided with an exhaust port communicated with the combustion chamber to discharge exhaust gas; and a crankcase which houses a crankshaft extending in a vertical direction, wherein an exhaust passage connected to the exhaust port of the cylinder to lead the exhaust gas out of the engine is provided with a catalyst storage chamber configured to store a catalytic converter for cleaning up the exhaust gas, the exhaust passage being integrally formed to the cylinder block, and the catalytic converter is mounted to the catalyst storage chamber by being inserted from a lower side thereof in such a manner as that at least one side end portion thereof is fitted to the catalyst storage chamber to permit expansion of the catalytic converter in an axial direction thereof.

According to the preferred embodiment of the present invention described above, at least one side end portion of the catalytic converter is fitted to the catalyst storage chamber so as to permit the expansion of the catalytic converter in the axial direction thereof, and accordingly, even if relative change in dimension in the axial direction is caused by the thermal expansion between the catalytic converter and the catalyst storage chamber, the catalytic converter can move in the axial direction relatively to the catalyst storage chamber.

The nature and the further characteristic features of the present invention will be made clearer from the following description made with reference to the accompanying drawings.

DESCRIPTION OF THE PREFERRED EMBODIMENT

An embodiment of the present invention will be described hereunder with reference to the accompanying drawings. It is to be noted that, in the following descriptions, terms "upper", "lower", "right", "left", "forward", "rearward" and the like terms indicating directions are used with reference to the illustrated state of the drawings or a state mounted to a hull.

First Embodiment (FIGS. 1 to 6)

Figure 1:
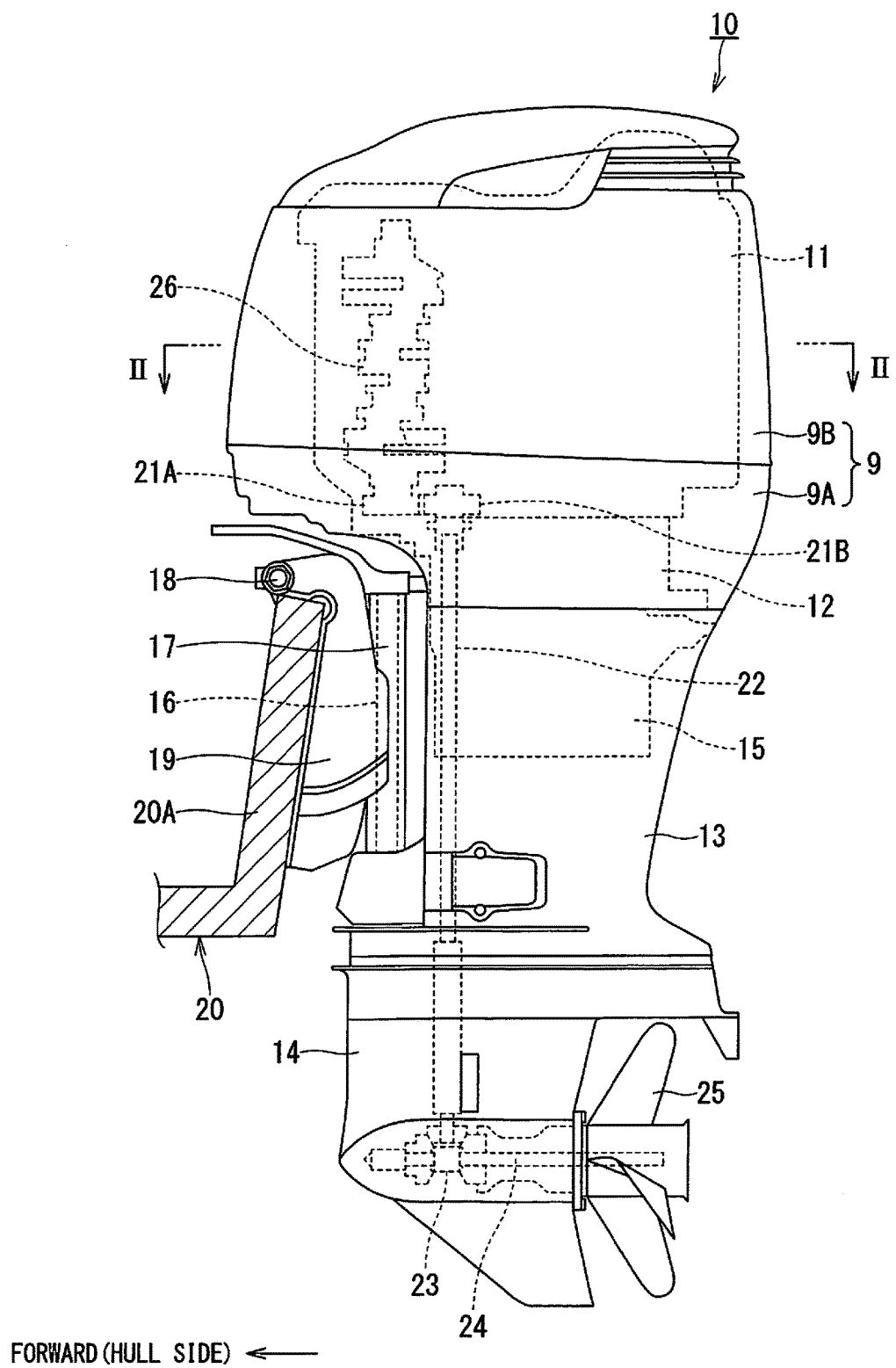
FIG. 1 is a left side view of an outboard motor to which first embodiment of a catalyst installation structure of an outboard motor of the present invention is applied.

With reference to FIG. 1 showing a left side view of an outboard motor to which first embodiment of a catalyst installation structure of an outboard motor of the present invention is applied, the outboard motor 10 is equipped with an engine holder 12, on which an engine 11 is mounted. The engine 11 is a vertical-type engine in which a crankshaft 26 (described later) is mounted substantially vertically. A drive shaft housing 13 and a gear case 14 are assembled in sequence under the engine holder 12.

In FIG. 1, an oil pan 15 is located under the engine holder 12 in which a lubricating oil is reserved. A vertically dividable engine cover 9 includes a lower engine cover 9A and an upper engine cover 9B so as to cover the engine 11 and engine holder 12.

The outboard motor 10 is supported pivotally in a horizontal direction by means of a pilot shaft 16 pivotally supported on a swivel bracket 17. The swivel bracket 17 is supported on a swivel shaft 18 pivotally in a vertical direction with respect to a clamp bracket 19, which is attached to a stern (transom) 20A of a hull 20. Consequently, the outboard motor 10 is mounted on the hull 20 swingably in a horizontal direction (steering direction) and vertical direction (trim and tilt direction).

A driving force generated on the crankshaft 26 of the engine 11 is transmitted through reduction gears 21A and 21B to a drive shaft 22 disposed so as to extend substantially vertically in the drive shaft housing 13 and gear case 14 and is then transmitted through a shift mechanism 23 and propeller shaft 24 disposed in the gear case 14 to a propeller 25, thereby turning the propeller 25 in a forward or reverse direction. According to such arrangement, the outboard motor 10 causes the hull 20 to move forward or backward.

Figure 2:
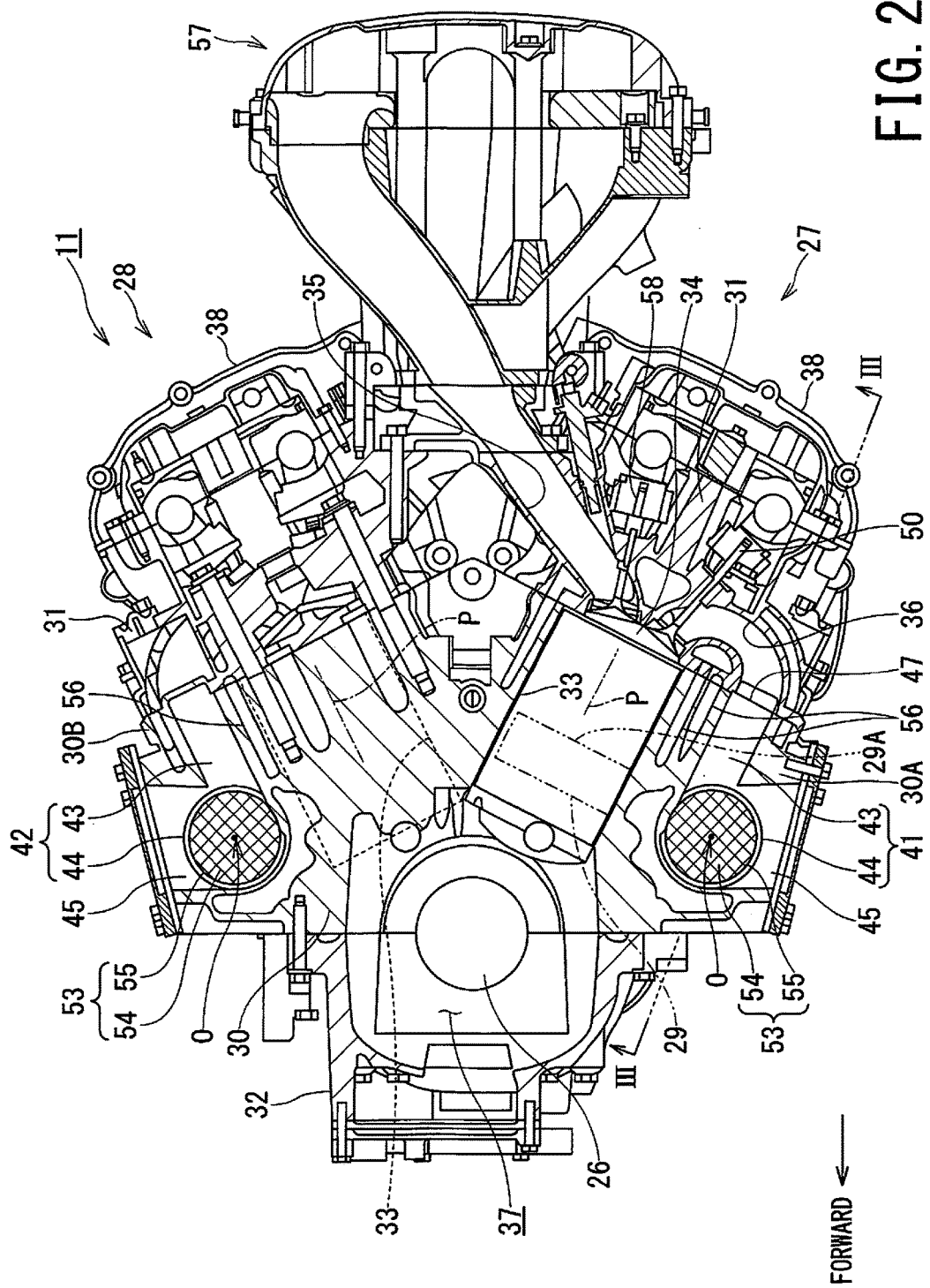
FIG. 2 is a sectional view taken along the line II-II in FIG. 1.

As shown in FIGS. 1 and 2, the engine 11 is a four-stroke V-type engine which includes the crankshaft 26 extending in a vertical direction, a left bank 27 extending diagonally left rearward, and a right bank 28 extending diagonally right rearward. In the four-stroke V-type engine, the left bank 27 is composed of a cylinder head 31 and a cylinder head cover 38 placed in sequence behind a left bank portion 30A of a cylinder block 30, and the right bank 28 is composed of a cylinder head 31 and a cylinder head cover 38 placed in sequence behind a right bank portion 30B of the cylinder block 30. Further, a crankcase 32 is placed in front of the cylinder block 30.

As shown in FIG. 2, cylinders 33 are formed in a horizontal direction inside the left bank portion 30A of the cylinder block 30, extending diagonally left rearward. Cylinders 33 are also formed in a horizontal direction inside the right bank portion 30B of the cylinder block 30, extending diagonally right rearward. Pistons 29 are reciprocally located in the cylinders 33 and coupled to the crankshaft 26 via connection rods, not shown.

Along cylinder axes P of the cylinders 33 in the left bank portion 30A and right bank portion 30B of the cylinder block 30, the cylinder heads 31 are fixed, respectively, to the left bank portion 30A and right bank portion 30B so as to cover the cylinders 33, and at the same time, to form combustion chambers 34 in conjunction with respective cylinders 33 in the left bank portion 30A and right bank portion 30B.

Moreover, in the left bank portion 30A and right bank portion 30B of the cylinder block 30, intake ports 35 communicated with the combustion chambers 34 are formed in the cylinder heads 31 inwardly of the cylinder axes P of the cylinders 33 in a width direction of the outboard motor. Furthermore, in the left bank portion 30A and right bank portion 30B of the cylinder block 30, exhaust ports 36 communicated with the combustion chambers 34 are formed in the cylinder heads 31 outwardly of the cylinder axes P of the cylinders 33 in the width direction of the outboard motor.

The crankcase 32 is coupled to the cylinder block 30, thereby forming a crank chamber 37 in conjunction with the cylinder block 30, and the crankshaft 26 is housed in the crank chamber 37. Here, in each of the above-mentioned left bank 27 and right bank 28, plural cylinder assemblies 40 each equipped with a cylinder 33, a combustion chamber 34, an intake port 35, and an exhaust port 36 are arranged side by side in a vertical direction as shown in FIGS. 3 and 4.

More specifically, according to the present embodiment, three cylinder assemblies 40 are arranged side by side in the vertical direction in each of the right bank 28 and left bank 27, thus configuring the engine 11 into a V-type six-cylinder four-stroke engine.

Figure 3:
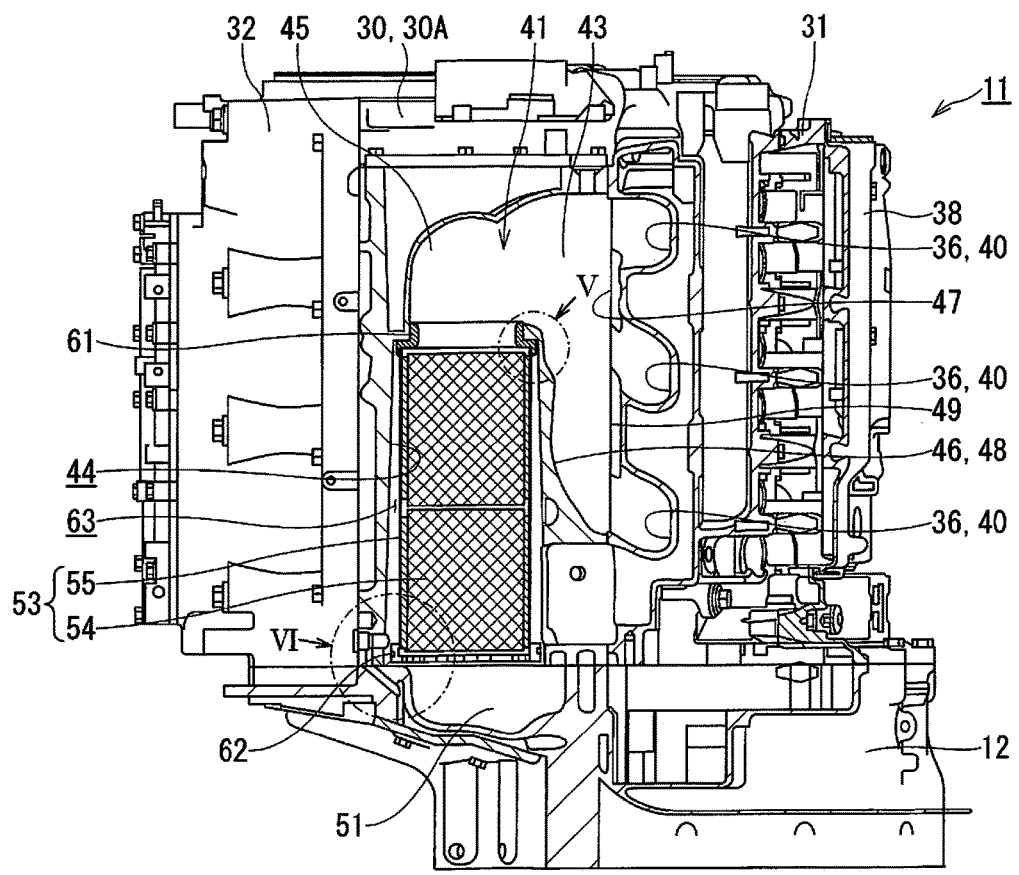
FIG. 3 is a sectional view taken along the line III-III in FIG. 2.
Figure 4:
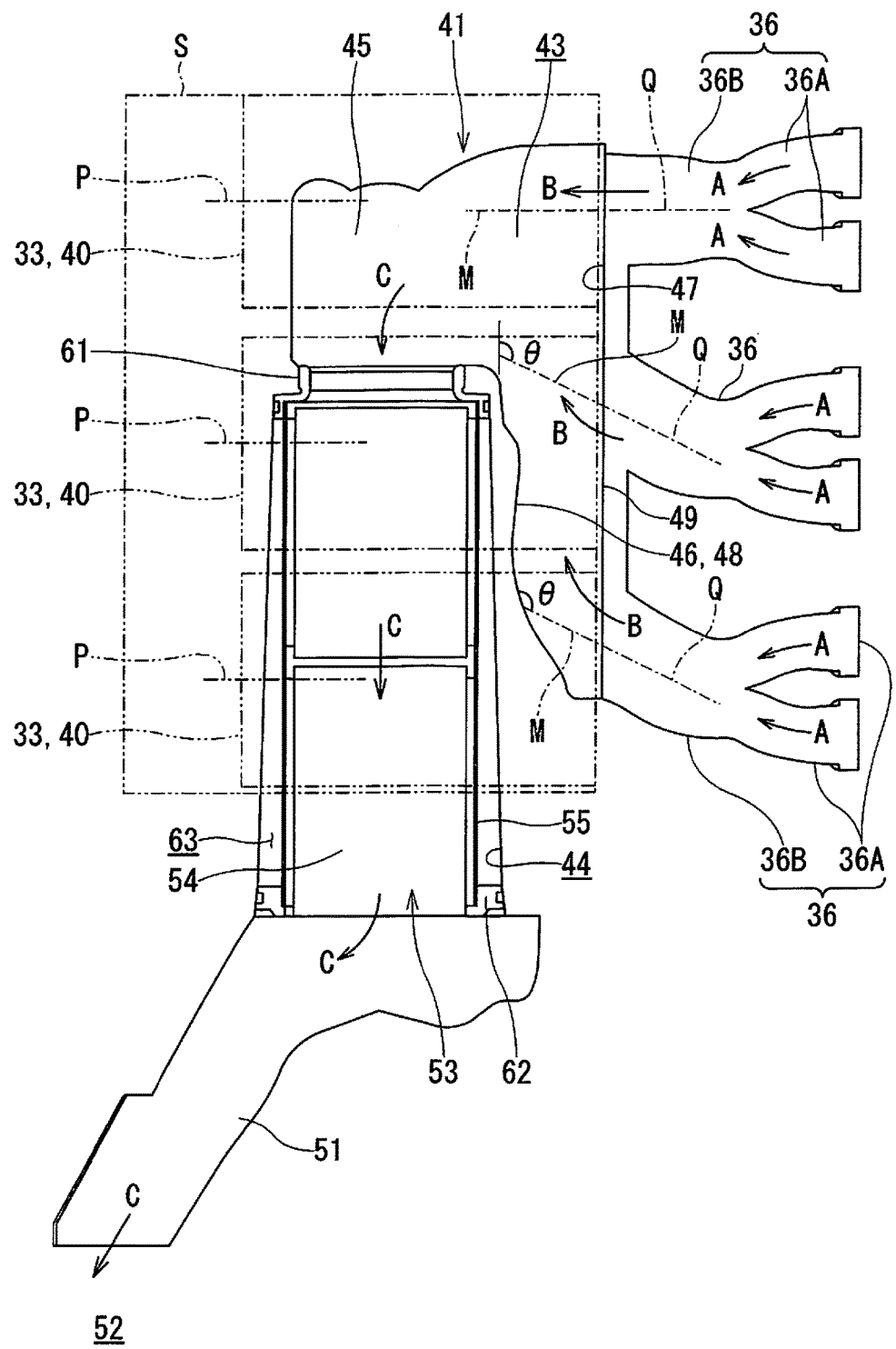
FIG. 4 is a schematic diagram illustrating an exhaust passage of an exhaust port shown in FIGS. 2 and 3.

As shown in FIGS. 2, 3, and 4, the respective exhaust ports 36 of the plural cylinder assemblies 40 in the left bank 27 are connected with a left exhaust passage 41 so as to lead exhaust gas from the exhaust port 36 out of the engine 11. The left exhaust passage 41 is formed integrally with the left bank portion 30A of the cylinder block 30.

The respective exhaust ports 36 of the plural cylinder assemblies 40 in the right bank 28 are connected with a right exhaust passage 42 so as to lead the exhaust gas from the exhaust port 36 out of the engine 11. The right exhaust passage 42 is formed integrally with the right bank portion 30B of the cylinder block 30. Each of the left exhaust passage 41 and right exhaust passage 42 includes an exhaust manifold 43 serving as a first exhaust passage portion and a catalyst storage chamber 44 serving as a second exhaust passage portion.

The exhaust manifold 43 is mounted on at least one of both the lateral sides, in the present embodiment, on both sides, of the cylinder block 30 in the width direction. That is, the exhaust manifold 43 of the left exhaust passage 41 is provided in lateral part of the cylinder block 30 on the left side in the width direction (left bank portion 30A), corresponding to the left bank 27, while the exhaust manifold 43 of the right exhaust passage 42 is provided in lateral part of the cylinder block 30 on the right side in the width direction (right bank portion 30B), corresponding to the right bank 28.

Furthermore, as shown in FIGS. 3 and 4, in particular, the exhaust manifolds 43 collect the exhaust gas discharged from the respective exhaust ports 36 of the plural cylinder assemblies 40.

In addition, a plurality of exhaust guiding portions 46 are provided for the respective exhaust manifolds 43 of the left exhaust passage 41 and right exhaust passage 42 so as to guide the exhaust gas discharged from the respective exhaust ports 36 of the plural cylinder assemblies 40 to connecting portions 45 between the exhaust manifolds 43 and catalyst storage chambers 44. Each of the exhaust guiding portions 46 is formed as a vertical plane opposed to a joint surface (parting plane) 47 between the cylinder block 30 and the cylinder head 31. The exhaust gas flowing in the exhaust port 36 as indicated by arrow "A" in FIG. 4 is guided upward by the exhaust guiding portion 46 as indicated by arrow "B" in the exhaust manifold 43, and the exhaust gas then reaches the connecting portion 45 between the exhaust manifold 43 and the catalyst storage chamber 44.

Each of the exhaust guiding portions 46 of the exhaust manifolds 43 is composed of a concave groove 48 formed integrally with the cylinder block 30 (left bank portion 30A and right bank portion 30B). Each of the concave grooves 48 has an opening 49 which opens to the side of the cylinder head 31 in a direction of the cylinder axis P of the cylinder 33. The opening 49 of the concave groove 48 is closed by the cylinder head 31 to thereby form the exhaust manifold 43.

Incidentally, since two exhaust valves 50 (FIG. 2) are installed in each combustion chamber 34, the exhaust port 36 of each of the plural cylinder assemblies 40, which is provided in the cylinder head 31, is formed into a Y-shape. That is, each exhaust port 36 is bifurcated into branch portions 36A, which are communicated with the combustion chamber 34, as shown in FIG. 4, and a trunk portion 36B communicated with the branch portions 36A is connected to the exhaust manifold 43 generally forming a shape turned in U-shape by approximately 180 degrees as shown in FIG. 2.

Furthermore, in the exhaust port 36 of each of the plural cylinder assemblies 40, an extension (extending line) M of a center line Q of the trunk portion 36B is provided in parallel to a plane S passing through the cylinder axes P of the cylinders 33 in the plural cylinder assemblies 40, and the extension M extends linearly or at an angle toward a connecting portion 45 between the exhaust manifold 43 and the catalyst storage chamber 44.

In the exhaust port 36 in which the extension M of the center line Q of the trunk portion 36B is set at an angle toward the connecting portion 45, the extension M forms an obtuse angle θ with the exhaust guiding portion 46, or an extension plane thereof, of the exhaust manifold 43. Therefore, the exhaust gas flowing into the exhaust manifold 43 through the exhaust ports 36 flows smoothly to the connecting portion 45 between the exhaust manifold 43 and the catalyst storage chamber 44.

As shown in FIG. 2, the catalyst storage chamber 44 in the left exhaust passage 41 is formed integrally on the left bank portion 30A of the cylinder block 30 and the catalyst storage chamber 44 in the right exhaust passage 42 is formed integrally on the right bank portion 30B of the cylinder block 30, both being, for example, substantially circular in passage section.

As shown in FIGS. 3 and 4, the catalyst storage chambers 44 are communicated with both the connecting portions 45 of the exhaust manifolds 43 and an exhaust passage 51 of the engine holder 12, thereby connecting exhaust manifolds 43 with an exhaust muffler chamber 52 in the drive shaft housing 13 installed outside the engine 11. Then, catalytic converters 53 having, for example, a circular shape in section for purifying the exhaust gas are installed and housed in the catalyst storage chambers 44.

Each catalytic converter 53 is configured such that a catalyst carrier 54 formed into, for example, a columnar shape and equipped with an exhaust purification function is housed in a catalyst tube 55, having a cylindrical shape, for example. When the catalyst carrier 54 comes into contact with exhaust gas, it chemically changes toxic substances such as carbon monoxide, hydrocarbon, nitrogen oxides, and the like contained in the exhaust gas into water, carbon dioxide, nitrogen or the like via oxidation-reduction reactions to thereby purify the exhaust gas.

Accordingly, the exhaust gas produced in the combustion chambers 34 of the plural cylinder assemblies 40 in the left bank 27 and right bank 28 of the engine 11 shown in FIG. 2, flows in the direction of the arrow "A" (FIG. 4) through the exhaust ports 36 of the cylinder assemblies 40 in the left bank 27 and right bank 28 and into the respective exhaust manifolds 43 of the left exhaust passage 41 and right exhaust passage 42.

As shown in FIGS. 3 and 4, the exhaust gas flowing into each exhaust manifold 43 ascends as indicated by the arrow "B" by being guided by the exhaust guiding portion 46, and then reaches the connecting portion 45 between the exhaust manifold 43 and the catalyst storage chamber 44. The exhaust gas flows downward in the connecting portion 45 as indicated by the arrow "C" by reversing its direction and flows into the catalytic converter 53 in the catalyst storage chamber 44 in order to be purified.

The exhaust gas purified by the catalytic converters 53 flows downward in the exhaust passage 51 of the engine holder 12 as indicated by the arrow "C" and flows into the exhaust muffler chamber 52 of the drive shaft housing 13, thereby being expanded and muffled therein. Subsequently, the exhaust gas flows in an exhaust passage, not shown, formed around the propeller shaft 24 in the gear case 14 shown in FIG. 1 and is discharged into water from a center of the propeller 25.

As shown in FIG. 2, cooling water passages 56 are formed around the cylinders 33 in the left bank portion 30A and the right bank portion 30B of the cylinder block 30. However, in a case where the circumferential portions of the cylinders 33 are located closer to the side of the crankshaft 26 than to positions of top faces 29A of the pistons 29 located at bottom dead center during reciprocation of the pistons 29 in the cylinders 33, these circumferential portions have relatively low temperatures, and thus, the cooling water passage 56 is not provided around the circumferences of the cylinders 33 on the side of the crankshaft 26.

Because of the reason mentioned above, the center locations O of the passage sections in the catalyst storage chambers 44 of the left exhaust passage 41 and the right exhaust passage 42 are positioned closer to the side of the crankshaft 26 than to the positions of the top faces 29A of the pistons 29 located at the bottom dead center in the cylinders 33, thus the catalyst storage chambers 44 being located close to the cylinders 33.

Further, in FIG. 2, reference numeral 57 denotes an intake manifold connected to the intake ports 35 of the engine 11 so as to lead fuel-air mixture to the combustion chambers 34 through the intake ports 35 when intake valves 58 are opened.

Figure 5:
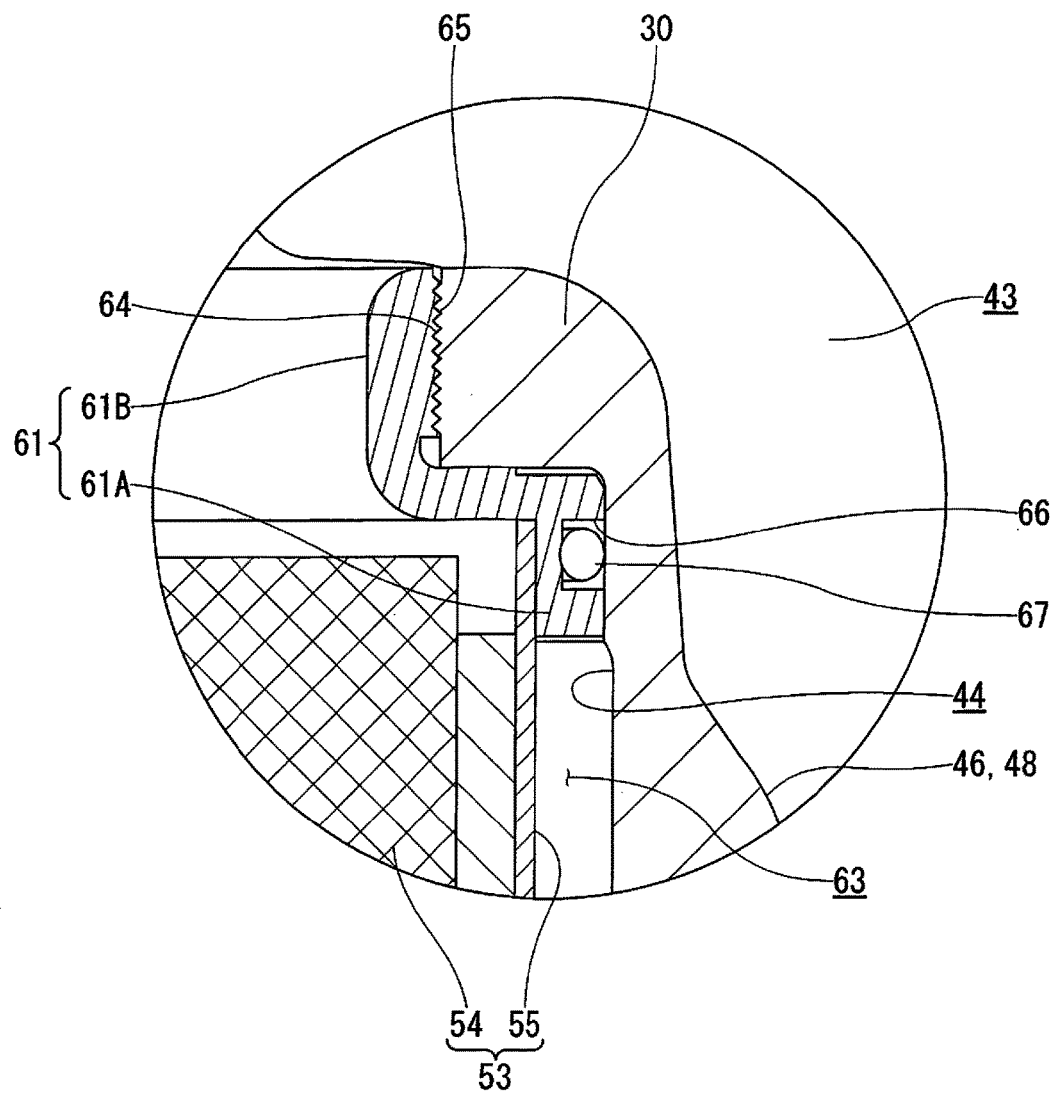
FIG. 5 is an enlarged sectional view showing a V-portion in FIG. 3.
Figure 6:
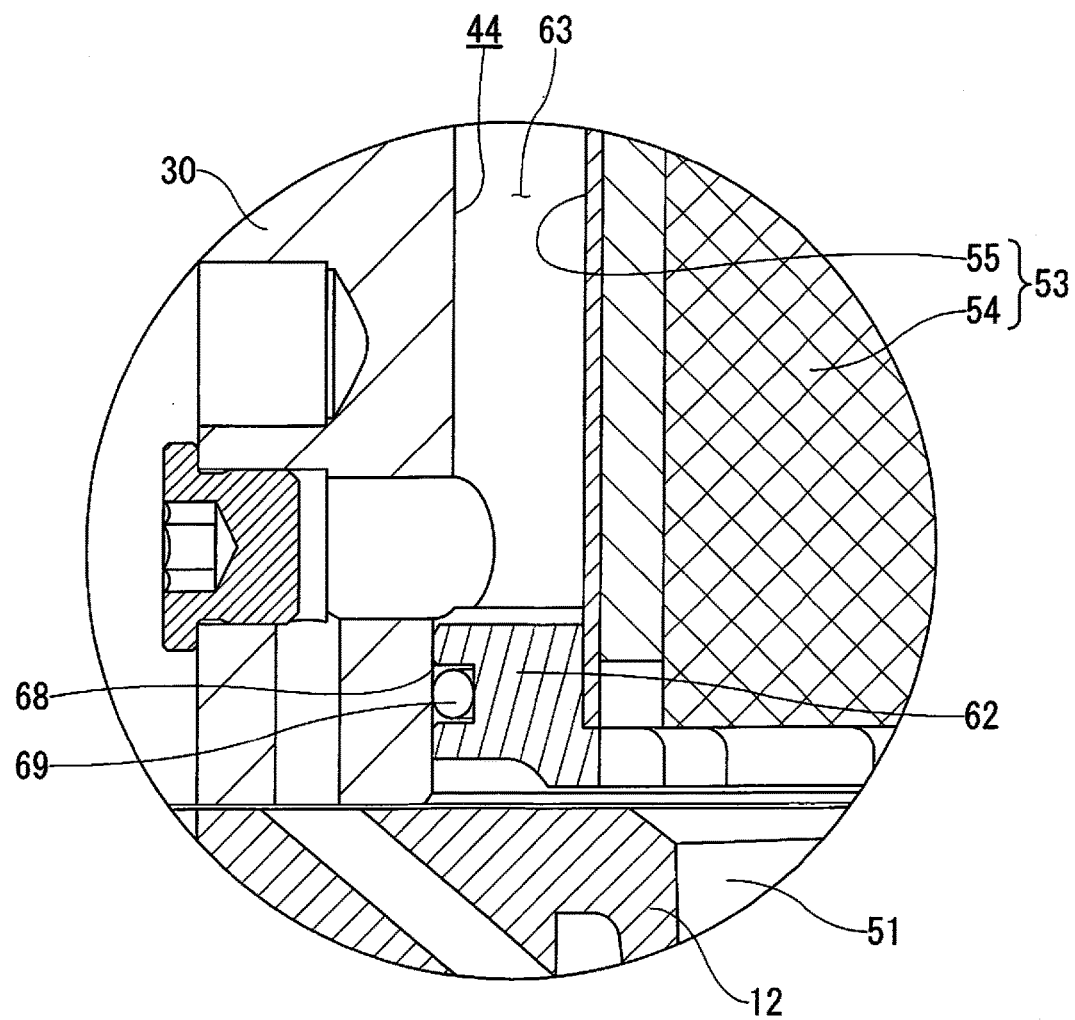
FIG. 6 is an enlarged sectional view showing a VI-portion in FIG. 3.

As shown in FIGS. 3, 5, and 6, an upper holder (i.e., upper supporting member) 61 and a lower holder (i.e., lower supporting member) 62 are firmly fixed, respectively, to an upper-side end portion and lower-side end portion of the catalyst tube 55 of each catalytic converter 53 by welding or the like. Since the upper holder 61 and lower holder 62 come into contact with an inner surface of the catalyst storage chamber 44, a gap 63 is formed between the catalyst tube 55 of the catalytic converter 53 and the inner surface of the catalyst storage chamber 44.

As shown in FIGS. 3 and 5, the upper holder 61 has a large-diameter portion 61A and a small-diameter portion 61B. The catalyst tube 55 is firmly fixed to an inner circumferential surface of the large-diameter portion 61A and an external thread portion 64 is formed on an outer circumferential surface of the small-diameter portion 61B. The catalytic converter 53 is inserted from the lower side of the catalyst storage chamber 44, and when the external thread portion 64 of the upper holder 61 of the catalytic converter 53 is screwed into an internal thread portion 65 formed in an upper end portion of the catalyst storage chamber 44, the catalytic converter 53 is fastened to the catalyst storage chamber 44 by means of screw.

A ring groove 66 is formed in an outer circumferential surface of the large-diameter portion 61A of the upper holder 61, and an O-ring 67, serving as an annular sealing member, is fitted in the ring groove 66. The O-ring 67 seals the upper-side end portion of the catalytic converter 53 and the inner surface of the catalyst storage chamber 44 in a radial direction.

As shown in FIGS. 5 and 6, the lower holder 62 has an annular shape, and the catalyst tube 55 of the catalytic converter 53 is firmly fixed to an inner circumferential surface of the lower holder 62. A ring groove 68 is formed in an outer circumferential surface of the lower holder 62, and an O-ring 69, serving as an annular sealing member, is fitted in the ring groove 68. The O-ring 69 seals the lower-side end portion of the catalytic converter 53 and the inner surface of the catalyst storage chamber 44 in a radial direction.

As shown in FIGS. 3, 5, and 6, the respective O-rings 67 and 69 on the upper holder 61 and lower holder 62 of the catalytic converter 53 seal the upper and lower portions of the gap 63, respectively, thereby hermetically sealing the gap 63. Therefore, the gap 63 in the present embodiment is formed as a cooling water passage through which cooling water flows, and the catalytic converter 53 is cooled directly by the cooling water flowing through the gap 63.

Furthermore, the catalytic converter 53 is configured such that at least one end in an axial direction, (i.e., lower-side end portion to which the lower holder 62 is firmly fixed in the present embodiment), is fitted in the catalyst storage chamber 44 by the lower holder 62 including the O-ring 69 in such a way as to permit axial expansion and contraction of the catalytic converter 53 due to, for example, thermal expansion.

In this regard, it is to be note that the catalytic converter 53 may be configured such that the lower holder in the lower-side end portion will be screw-fastened to the catalyst storage chamber 44, with the upper holder in the upper-side end portion being fitted in the catalyst storage chamber 44 in such a way as to permit axial expansion and contraction of the catalytic converter 53. Furthermore, the catalytic converter 53 may be configured such that both upper holder in the upper-side end portion and lower holder in the lower-side end portion will be fitted in the catalyst storage chamber 44, by being supported in the catalyst storage chamber 44 by a stay or the like, in such a way as to permit axial expansion and contraction of the catalytic converter 53.

According to the present embodiment described above, the following advantageous effects and/or functions (1) to (4) can be achieved.

(1) As shown in FIGS. 3, 5 and 6, although the upper holder portion 61 of the upper side end portion of the catalytic converter 53 is fixed to the catalyst storage chamber 44, the lower holder portion 62 of the lower side end portion thereof is fitted into the catalyst storage chamber 44 to be expandable in the axial direction of the catalytic converter 53. Accordingly, even if the relative change in dimension in the axial direction between the catalytic converter 53 and the catalyst storage chamber 44 is caused by the thermal expansion therebetween, the catalytic converter 53 can move relatively in the axial direction with respect to the catalyst storage chamber 44. As a result, the damage to the catalytic converter 53 by such thermal expansion can be surely prevented from causing, and hence, improving the durability of the catalytic converter 53.

(2) As shown in FIG. 3, the gap 63 formed between the catalyst tube 55 of the catalytic converter 53 and the inner surface of the catalyst storage chamber 44 is hermetically sealed and maintained by the O-ring 67 provided for the upper holder portion 61 of the catalytic converter 53 and the O-ring 69 provided for the lower holder portion 62 of the catalytic converter 53, and the thus sealed gap is constituted as the cooling water passage. Therefore, since the catalytic converter 53 can be directly cooled, by the cooling water passing through this gap 63, the cooling efficiency to the catalytic converter 53 can be improved. As mentioned above, by improving the catalytic converter cooling efficiency, the sectional area of the gap 63 through which cooling water flows and the amount of the cooling water flowing into the gap 63 can be both reduced, thus being advantageous.

(3) As shown in FIGS. 3 and 6, the O-ring 69, serving as annular sealing member, sealing the lower-side end portion of the catalytic converter 53 and the inner surface of the catalyst storage chamber 44 in a radial direction is fitted to the lower holder portion 62 of the catalytic converter 53, and accordingly, even if the relative change in dimension in the axial direction between the catalytic converter 53 and the catalyst storage chamber 44 is caused by the thermal expansion therebetween, the O-ring 69 relatively moves in the axial direction with respect to the inner surface of the catalyst storage chamber 44, allowing the relative dimensional change in the axial direction to be caused, and the sure sealing performance can be achieved.

(4) As shown in FIGS. 3, 5 and 6, the O-ring 67, serving as annular sealing member, sealing the upper side end portion of the catalytic converter 53 and the inner surface of the catalyst storage chamber 44 in the radial direction is fitted to the upper holder portion 61 in the catalytic converter 53, and the O-ring 69 serving as the annular sealing member are also provided as mentioned above, and accordingly, even if the relative change in dimension in the axial direction between the catalytic converter 53 and the catalyst storage chamber 44 is caused by the thermal expansion therebetween, the O-ring 67 and O-ring 69 can permit the absorption of the relative change in dimension in the axial direction by the elastic deformation thereof, and relatively move in the axial direction with respect to the inner surface of the catalyst storage chamber 44, thereby allowing the relative dimensional change in the axial direction to be caused, and surely achieving the improved sealing performance.

Figure 7:
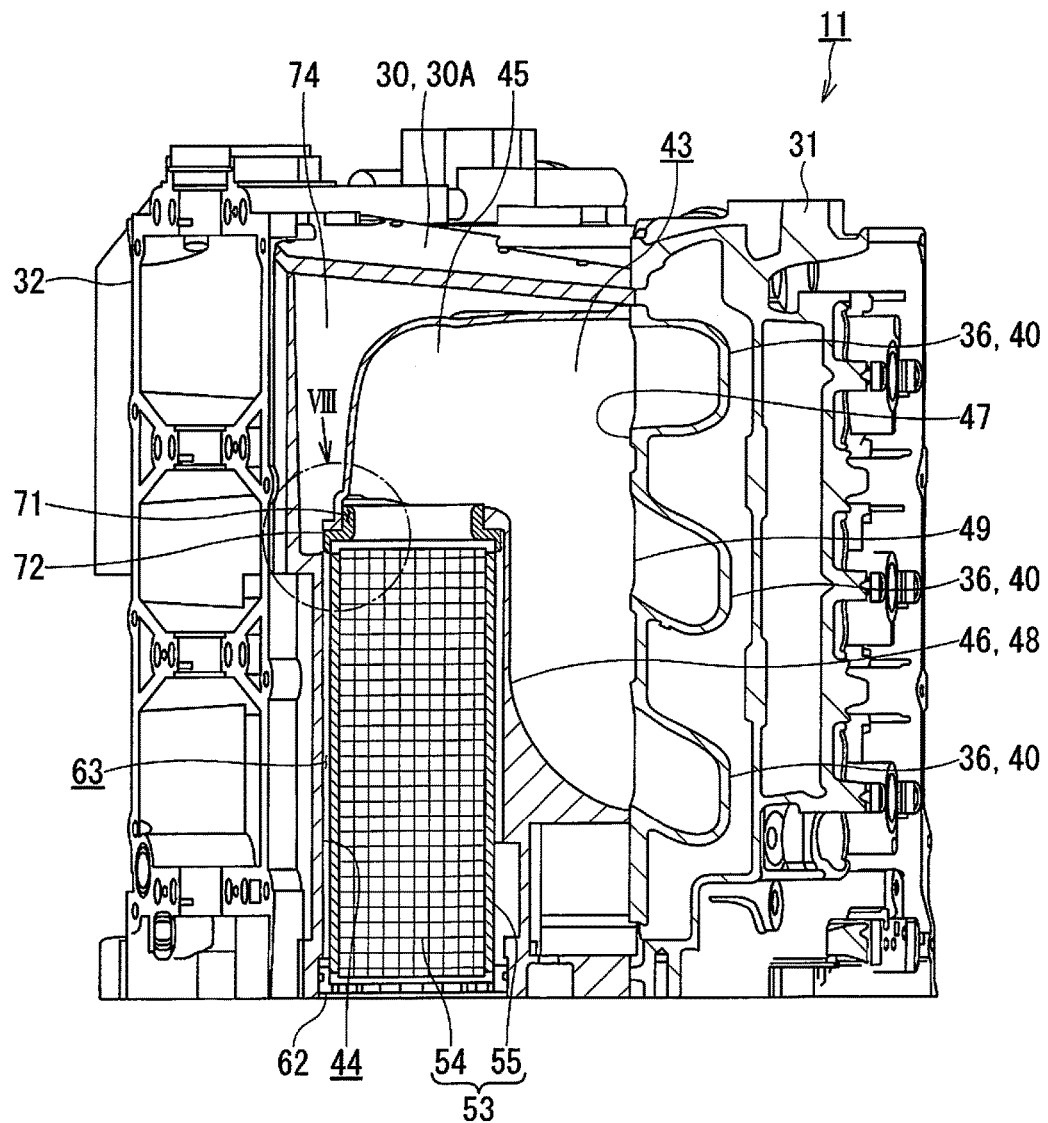
FIG. 7 is a sectional view, corresponding to FIG. 3, showing a second embodiment of a catalyst installation structure of an outboard motor of the present invention is applied.
Figure 8:
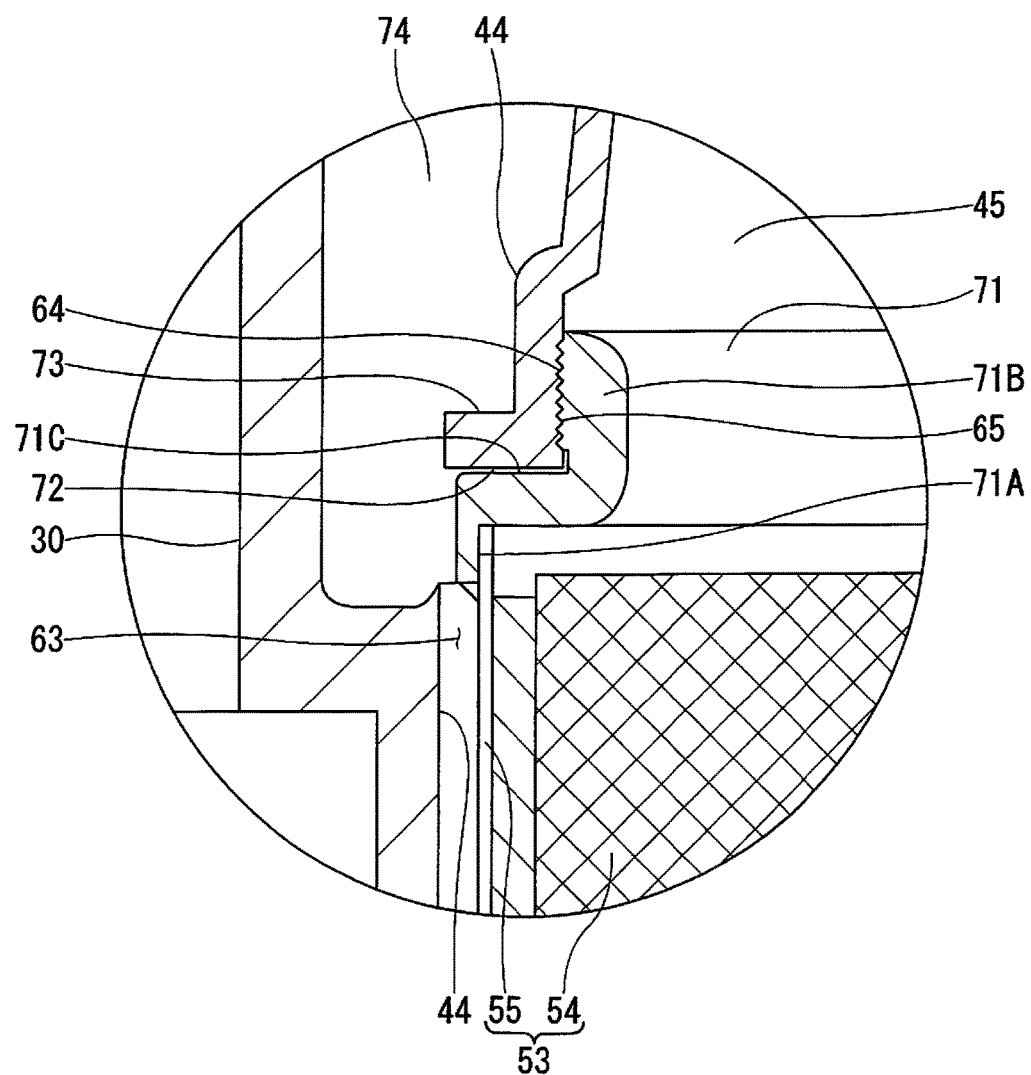
FIG. 8 is an enlarged sectional view showing a VIII portion in FIG. 7.

Second Embodiment (FIGS. 7 and 8)

FIG. 7 is a view, corresponding to FIG. 3, illustrating the catalyst installation structure according to the second embodiment of the present invention. In the following description of the second embodiment, the same reference numerals are added to the same or like portions in the first embodiment, and the duplicated description thereof will be omitted herein.

The present second embodiment differs from the first embodiment in that the O-ring 67 in the first embodiment is not provided to an upper holder portion 71 secured to the upper side end portion of the catalyst tube 55 in the catalytic converter 53, and a gasket 72, as sealing means, is disposed between the upper holder portion 71 and the catalyst storage chamber 44 so as to seal the catalyst storage chamber 44 and the catalytic converter 53 in the axial direction.

More specifically, as shown in FIGS. 7 and 8, the upper holder portion 71 includes a large-diameter portion 71A and a small-diameter portion 71B, and a staged portion 71C acting as an abutting surface disposed between these large and small diameter portions 71A and 71B.

In this upper holder portion 71, the catalyst tube 55 is fixed, by means of welding, for example, of the catalytic converter 53 to the inner surface of the large-diameter portion 71A, and a male screw (threaded) portion 64 is also formed in an outer peripheral surface of the small-diameter portion 71B. Further, a female screw (threaded) portion 65 is formed to an upper end portion of the catalyst storage chamber 44, and a flange portion 73 is formed below the female screw portion 65.

The gasket 72 is interposed in a gap between the abutting surface 71C of the upper holder portion 71 and the flange portion 73 of the catalyst storage chamber 44.

When the male screw portion 64 of the upper holder portion 71 is screw-engaged with the female portion 65 of the catalyst storage chamber 44, a pressure (i.e., surface-pressure) is applied to the gasket 72 by the abutting surface 71C of the upper holder portion 71 and the flange portion 73 of the catalyst storage chamber 44. Under this state, the catalytic converter 53, the catalyst storage chamber 44 and the cooling water passage 74 communicating with this chamber 44 are sealed in the axial direction. Further, although such gasket 72 may be made from a non-metallic gasket or O-ring 67, such as shown in FIG. 5, having high heat-resisting property, the use of the metallic gasket excellent in the heat-resisting property will be preferred.

As mentioned hereinabove, according to the present second embodiment, the following advantageous effect (5) can be achieved in addition to those (1) to (3) achieved by the first embodiment.

(5) The heated exhaust gas flows on the side of the upper side end portion of the catalytic converter 53. In view of this matter, in the second embodiment, the gasket 72 having excellent heat resisting property is interposed also acting as sealing means between the upper holder portion 71 and the catalytic converter 53 and the catalyst storage chamber 44. Thus, deterioration of materials or portions of the sealing means can be effectively reduced, and the sealing performance thereof can be ensured and maintained for a long term.

It is further to be noted that although the embodiments of the present invention described above are presented only by way of examples, and not intended to limit the scope of the invention, and the embodiments can be implemented in various other forms, and various omissions, replacements, and modifications may be made without departing from the spirit of the present invention.

What is claimed is:

1. A catalyst installation structure of an outboard motor equipped with a four-stroke engine, in which the four-stroke engine includes a cylinder block in which a cylinder is formed so as to extend in a horizontal direction, a cylinder head fixed to the cylinder block so as to cover the cylinder and to form a combustion chamber in conjunction with the cylinder, the cylinder head being provided with an exhaust port communicated with the combustion chamber to discharge exhaust gas, and a crankcase which houses a crankshaft extending in a vertical direction, wherein the catalyst installation structure comprises:

an exhaust passage connected to the exhaust port of the cylinder to lead the exhaust gas out of the engine;
a catalytic converter for cleaning up the exhaust gas, wherein the catalytic converter includes a catalyst tube in which a catalyst having an exhaust clean-up performance is stored,
wherein the exhaust passage is provided with a catalyst storage chamber configured to store the catalytic converter,
wherein the exhaust passage is integrally formed to the cylinder block, and
wherein the catalytic converter is mounted to the catalyst storage chamber by being inserted from a lower side thereof in such a manner that at least one side end portion thereof is fitted to the catalyst storage chamber such that other side end portion of the catalytic converter is movable in an axial direction thereof relatively to the catalyst storage chamber.

2. The catalyst installation structure according to claim 1, wherein a gap is provided between the catalyst tube and the catalyst storage chamber of the cylinder block, wherein the gap includes a cooling water passage with seal members on both side end portions in the axial direction of the catalyst tube.

3. The catalyst installation structure according to claim 1, wherein the catalytic converter has an upper side end portion fastened to the catalyst storage chamber, the seal members include upper and lower side end seal members in which the lower side end seal member constitutes an annular seal member that seals the catalyst storage chamber and the catalytic converter in a radial direction thereof.

4. The catalyst installation structure according to claim 3, wherein the upper side end seal member includes an annular seal member that seals the catalyst storage chamber and the catalytic converter in a radial direction thereof.

5. The catalyst installation structure according to claim 3, wherein the upper side end seal member includes a gasket that seals the catalyst storage chamber and the catalytic converter in an axial direction thereof.

\* \* \* \* \*